US012460452B2

(12) United States Patent
Moranzoni et al.

(10) Patent No.: US 12,460,452 B2
(45) Date of Patent: Nov. 4, 2025

(54) DOOR FOR A MOTOR VEHICLE

(71) Applicant: FERRARI S.P.A., Modena (IT)

(72) Inventors: Ivan Moranzoni, Modena (IT); Angelo Narducci, Modena (IT); Roberto Guandalini, Modena (IT); Stefano Alneri, Modena (IT); Valerio Veglianti, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/820,942

(22) Filed: Aug. 30, 2024

(65) Prior Publication Data
US 2025/0084671 A1 Mar. 13, 2025

(30) Foreign Application Priority Data

Sep. 7, 2023 (IT) ........................ 102023000018348

(51) Int. Cl.
| | |
|---|---|
| *E05B 77/04* | (2014.01) |
| *B60J 5/04* | (2006.01) |
| *E05B 17/00* | (2006.01) |
| *E05B 79/20* | (2014.01) |

(52) U.S. Cl.
CPC ............ *E05B 77/04* (2013.01); *B60J 5/0461* (2013.01); *E05B 17/0062* (2013.01); *E05B 79/20* (2013.01)

(58) Field of Classification Search
CPC ....... B60J 5/0461; B60J 5/0433; E05B 77/04; E05B 17/0062; E05B 79/20
See application file for complete search history.

(56) References Cited

U.S. PATENT DOCUMENTS

| | | | | |
|---|---|---|---|---|
| 8,955,257 | B2 * | 2/2015 | Moriya | B60J 5/042 49/502 |
| 10,676,970 | B2 * | 6/2020 | Strigle | E05B 77/04 |
| 10,914,101 | B2 * | 2/2021 | Ishikawa | E05B 77/04 |
| 11,541,732 | B1 * | 1/2023 | Kovie | B60J 5/0443 |
| 11,660,939 | B2 * | 5/2023 | Kovie | B60J 5/0443 296/146.6 |
| 12,172,501 | B2 * | 12/2024 | Snyder | E05B 79/20 |

(Continued)

FOREIGN PATENT DOCUMENTS

JP 6612625 B2 11/2019

OTHER PUBLICATIONS

Italian Search Report in IT Application No. 202300018348, mailed Apr. 26, 2024, an English Translation attached hereto (6 pages).

*Primary Examiner* — Justin B Rephann
(74) *Attorney, Agent, or Firm* — Leason Ellis LLP (57) ABSTRACT

A door for a motor vehicle comprising: a lock available in a closed configuration and in an open configuration; a support body comprising a first portion and a second portion, which are integral to one another, when said door is in a normal operating condition; a ratchet supported by the first portion of the support body; a Bowden cable, which is interposed between the ratchet and the lock, can be operated by said ratchet to cause the lock to shift from the closed configuration to the open configuration and is at least partly housed in a first seat defined by the first portion of the support body; the support body comprises a preferential breaking area designed to break, in use, due a predetermined load in case of impact of the door, so as to determine the separation of the first portion carrying the Bowden cable and the ratchet from the second portion of the support body.

10 Claims, 8 Drawing Sheets

(56) References Cited

U.S. PATENT DOCUMENTS

| | | | |
|---|---|---|---|
| 2010/0109350 A1 | 5/2010 | Gschweng et al. | |
| 2013/0074413 A1* | 3/2013 | Moriya | E05B 79/20 49/394 |
| 2015/0197966 A1* | 7/2015 | Regnault | E05B 77/04 292/200 |
| 2019/0128025 A1* | 5/2019 | Ishikawa | E05B 77/04 |
| 2023/0077789 A1* | 3/2023 | Kovie | E05B 77/10 296/146.6 |
| 2023/0339298 A1* | 10/2023 | Snyder | E05B 77/04 |

\* cited by examiner

DOOR FOR A MOTOR VEHICLE

CROSS-REFERENCE TO RELATED APPLICATIONS

This patent application claims priority from Italian patent application no. 102023000018348 filed on Sep. 7, 2023, the entire disclosure of which is incorporated herein by reference.

TECHNICAL FIELD

The invention relates to a door assembly for a motor vehicle.

BACKGROUND

Motor vehicles are known, which basically comprise a body defining a passenger compartment and a pair of front doors hinged relative to the body.

Each front door is, in a known manner, movable between:
a closed position, in which it prevents access to and exit from the passenger compartment; and
an open position, in which it allows access to and exit from the passenger compartment.

Each door basically comprises:
a skeleton defining an outer wall of the door relative to the passenger compartment and an end pillar bent from the external wall towards the inside of the vehicle;
a panel defining an inner wall of the door relative to the passenger compartment opposite the outer wall; and
a compartment delimited between the aforementioned inner and outer walls and the pillar.

In particular, the pillar is located on the side opposite an edge of the door hinged to the body of the motor vehicle.

The front door on the driver's side further comprises:
a lock located inside the compartment;
a support body fixed to the skeleton;
a handle protruding from the outer wall to be operated by the driver and housed in a seat defined by the support body; and
a ratchet supported by the support body in a rotary manner, adjacent to the handle and capable of being operated by a key.

The lock comprises, in a known manner:
a closing mechanism, which is elastically loaded towards an open configuration, in which it is disengaged from a striker carried by a body of the motor vehicle so as to allow the door to be opened, and which can be moved, following the slamming of the door, to a closed configuration, in which it is coupled to the striker and prevents the door from opening; and
an opening mechanism, which can be operated to determine the movement of the closing mechanism from the open configuration to the closed configuration.

The opening mechanism is, according to a known solution, electrically controllable by the handle.

More in detail, the activation of the handle determines the activation of a microswitch, which generates a control signal for the opening mechanism, which causes the latter to shift from the closed configuration to the open configuration.

The lock further comprises an electric back-up system and a mechanical back-up system able to allow the opening mechanism to be operated in case the microswitch is not electrically powered, for example due to the fact that the motor vehicle battery is momentarily low.

The electric back-up system basically comprises a capacitive diode, which ensures a limited number of transitions of the opening mechanism from the closed configuration to the open configuration, even in the absence of an electrical power supply.

The mechanical back-up system comprises, in turn, a Bowden cable, which can be operated by the ratchet and is connected to the opening mechanism so as to cause it to shift from the closed configuration to the open configuration.

The Bowden cable is at least partly housed in a seat adjacent to the ratchet and defined by the support body.

In order to create a particularly compact constructive solution, the seat of the Bowden cable is adjacent to further components housed inside the compartment, for example parts of the lock, of the window regulators or sheet metal reinforcements.

The Applicant found out that, in case of a side impact of the motor vehicle, the intrusion of the support body towards the inside of the vehicle could lead to a pulling of the Bowden cable, due to an excess relative displacement of the ratchet relative to the support body or because of the presence of an obstacle that prevents the Bowden cable from following the ratchet without being pulled.

This could lead to an accidental and unwanted activation of the Bowden cable as well as to a consequent accidental activation of the opening mechanism, to a consequent accidental shift of the closing mechanism from the closed configuration to the open configuration and to a consequent accidental and unwanted opening of the door.

In the automotive industry, the aforementioned accidental opening of the door, following a side impact of the motor vehicle, needs to be avoided.

SUMMARY

The object of the invention is to provide a door for a motor vehicle, which allows manufacturers to fulfil the aforesaid need in a simple and economic fashion.

The aforesaid object is reached by the invention, as it relates to a door for a motor vehicle as described herein and set forth in the claims.

BRIEF DESCRIPTION OF THE DRAWINGS

The invention will be best understood upon perusal of the following detailed description of three preferred embodiments, which are provided by mere way of non-limiting example, with reference to the accompanying drawings, wherein.

DESCRIPTION OF EMBODIMENTS

Figure 1:
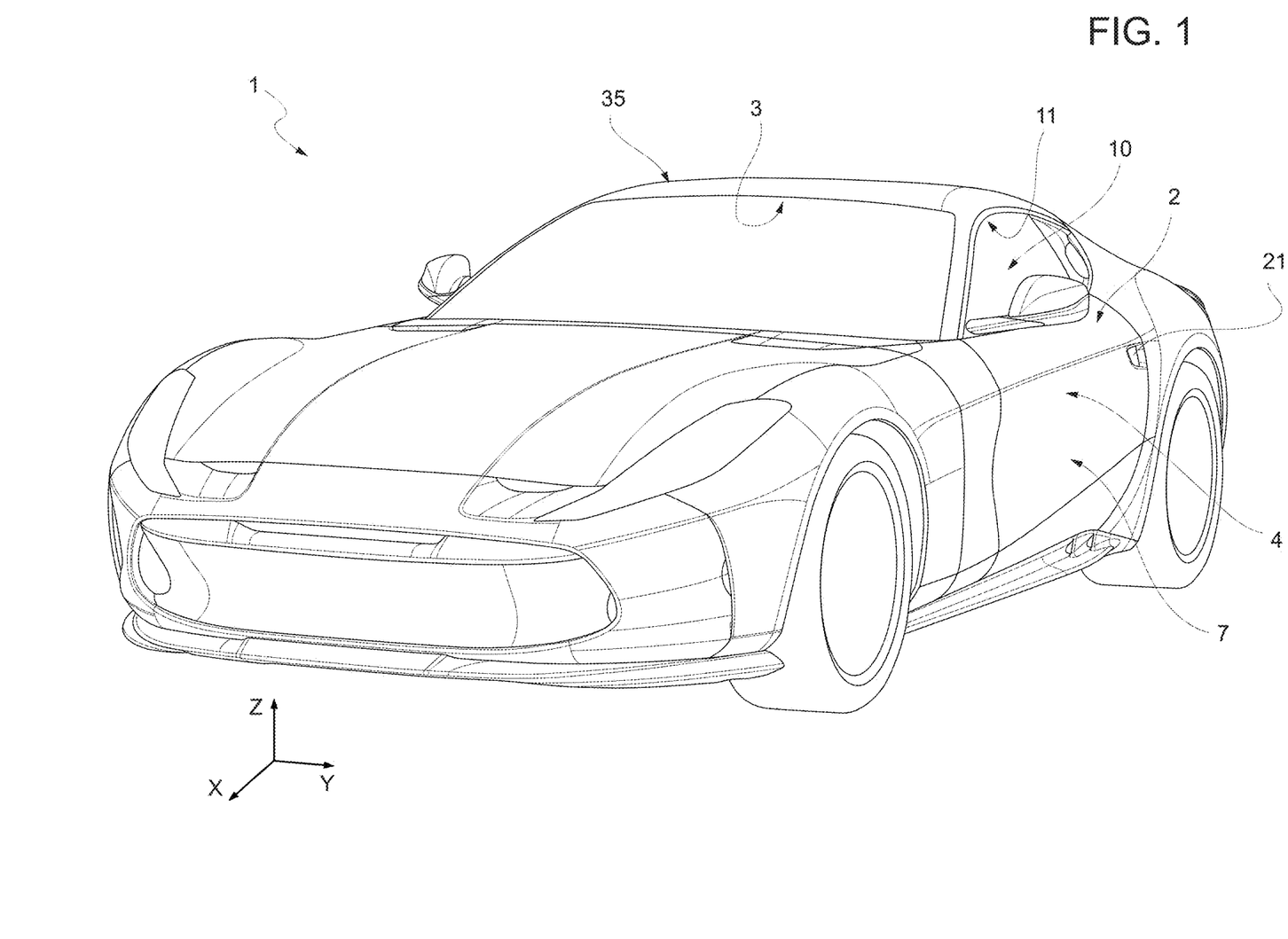
FIG. 1 is a perspective view of a motor vehicle with a door according to the invention.

With reference to FIG. 1, number 1 indicates a motor vehicle.

More in detail, the motor vehicle 1 comprises a body 2 delimiting a passenger compartment 3, a pair of doors 4 hinged to the body 2 and a roof 35.

Furthermore, it is possible to define:
a longitudinal axis X integral to the motor vehicle 1, which, in use, is horizontal and parallel to a normal travel direction of the motor vehicle 1;
a transverse axis X integral to the vehicle 1, which, in use, is horizontal and orthogonal to the axis X; and
an axis Z integral to the vehicle 1, which, in use, is vertical and orthogonal to the axes X, Y.

Hereinafter, reference will be made to a single door 4, the doors 4 being substantially identical to one another.

Figure 2:
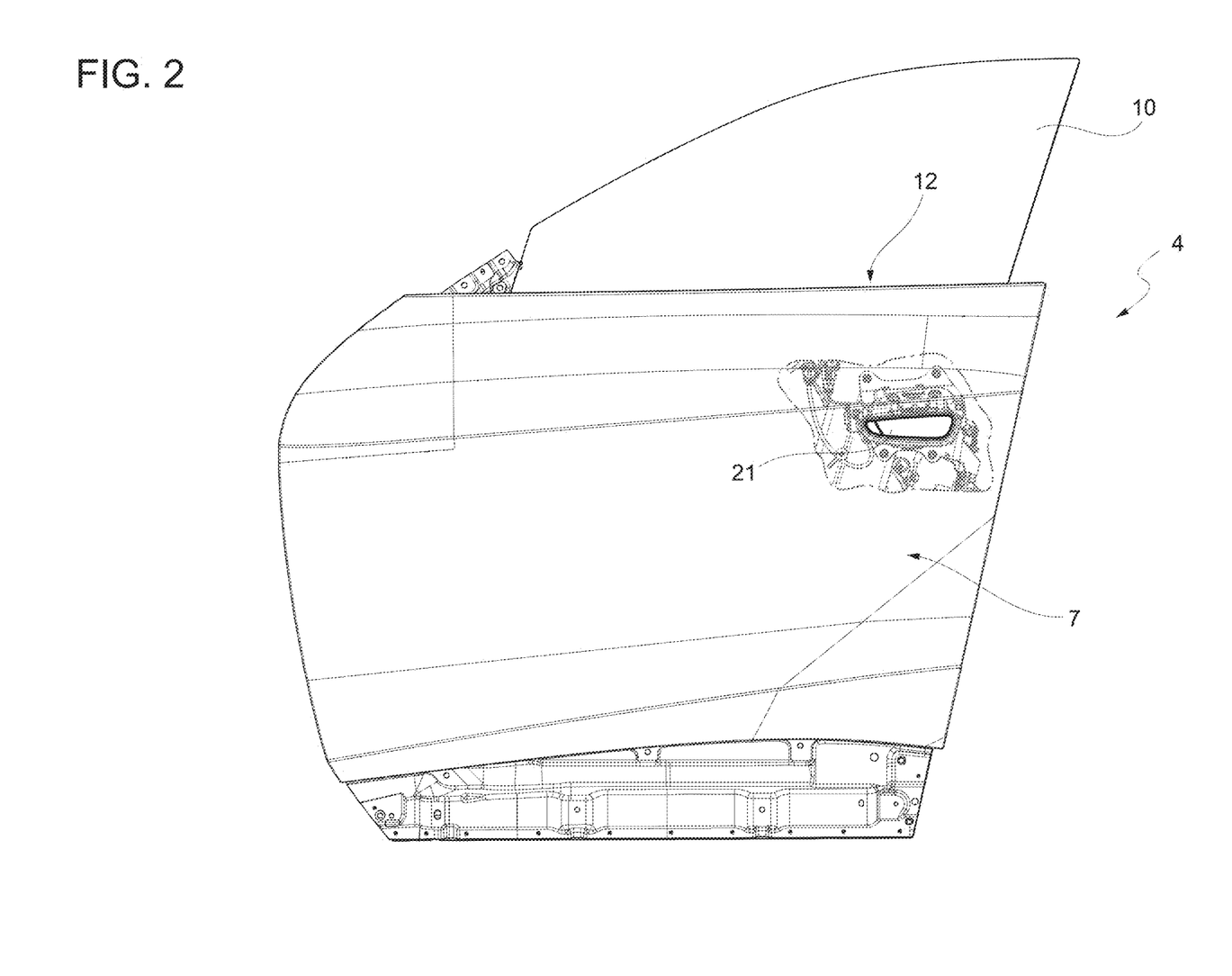
FIG. 2 is a view, from the outside of the motor vehicle, of the motor vehicle door of FIG. 1 on a much larger scale.

Each door 4 is movable (FIGS. 1 and 2) between:
a closing position, in which it cooperates with the body 2 and the roof 35 to delimit the passenger compartment 3, so as to prevent access to/exit from the passenger compartment 3 itself; and
an opening position, in which it allows access to and exit from the passenger compartment 3.

Furthermore, expressions such as "above", "under", "in front of", "behind" and others similar to them are used with reference to normal driving conditions of the motor vehicle 1.

The door 4 basically comprises (FIGS. 3 a 6):
a skeleton 5 defining a wall 7 delimiting the door 4 on the outside of the passenger compartment 3 and a pillar 8 bent from one end 14 of the wall 7 towards the inside of the body 2;
and
a panel 6 defining a wall 9 delimiting the door 4 on the inside of the passenger compartment 3 and arranged so as to cover the skeleton 5.

The skeleton 5 and the panel 6 define a compartment 13 between them.

The door 4 further comprises a window 10 sliding relative to the panel 6 and to the skeleton 5 through a slit 12 of the skeleton 5.

In particular, the window 10 can slide relative to the panel 6 between:
a lowered position, in which it is housed in the compartment 13 frees an opening 11; and
a lifted position, in which it comes out of the compartment 13 until it engages the opening 11.

Below is a description of the left front door 4 of the motor vehicle 1, namely the one located on the driver's side.

The door 4 further comprises:
a handle 21 (FIGS. 1 and 2) articulated with respect to the wall 7 on the outside of the body 2 so that it can be gripped by a driver;
a support body 20 (FIGS. 3 to 6) defined by the skeleton 5; and
a ratchet 22, which is supported by the support body 20 so as to rotate around an axis A thereof and provided with an axial end notch located under the handle 21 and capable of being operated by the driver by means of a key.

The door 4 further comprises:

an arm 23 fixed to the support body 20 and supporting an end 26 of the ratchet 22 opposite the notch in a rotary manner; and
a lever 24 hinged to the ratchet 22 around the axis A.

The door 4 further comprises a lock 25 (only schematically shown) located inside the compartment 13, which is known and described below only insofar as it is relevant for the understanding of the invention.

The lock 25 comprises, in turn:
a closing mechanism (not shown), which is elastically loaded towards an open configuration, in which it is disengaged from a striker (not shown) carried by the body 2 so as to hold the door 4 in the open position, and which can be moved, following the slamming of the door 4, to a closed configuration, in which it is coupled to the striker and prevents the door 4 from moving from the closed position to the open position; and
an opening mechanism (not shown), which can be operated to determine the movement of the closing mechanism from the open configuration to the closed configuration.

The door 4 further comprises a microswitch (not shown), which can be operated by the handle 21 to generate a control signal, which determines the activation of the opening mechanism and causes the opening mechanism of the lock 25 to shift from the closed configuration to the open configuration.

The lock 25 further comprises an electric back-up system (not shown) and a mechanical back-up system 30 (FIGS. 3 to 6) able to allow the opening mechanism to be operated in case the microswitch is not electrically powered, for example due to the fact that the battery of the motor vehicle 1 is momentarily low.

The electric back-up system basically comprises a capacitive diode, which ensures a limited number of transitions of the opening mechanism from the closed configuration to the open configuration, even in the absence of an electrical power supply.

The mechanical back-up system 30 comprises, in turn, a Bowden cable 31, which can be operated by the ratchet 22 and is connected to the opening mechanism so as to cause it to shift from the closed configuration to the open configuration.

The Bowden cable 31 comprises, in turn, a pair of axial ends 32, 33.

Figure 3:
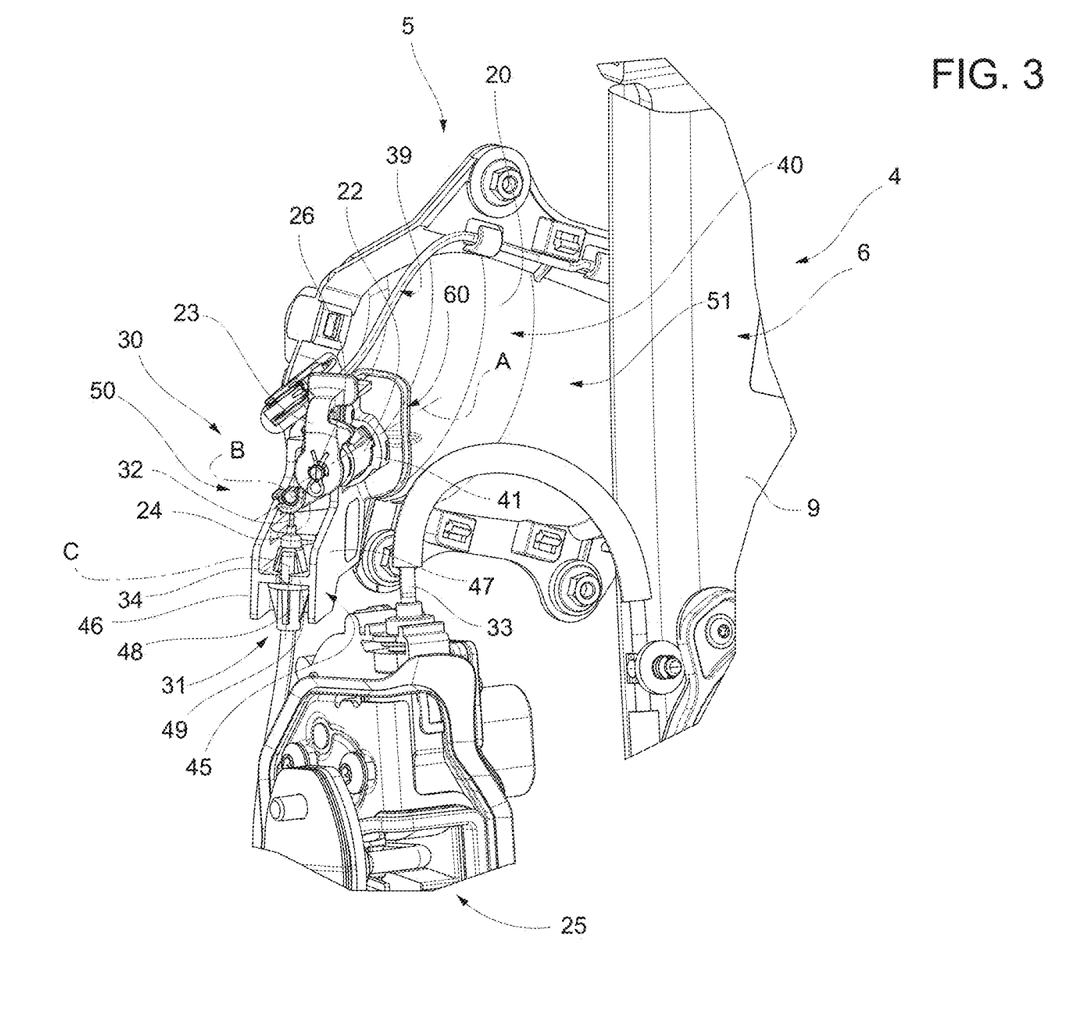
FIG. 3 is a perspective view, from the inside of the motor vehicle, on a further enlarged scale and according to a first visual angle, of first components of the door of FIGS. 1 and 2, with parts removed for greater clarity.
Figure 4:
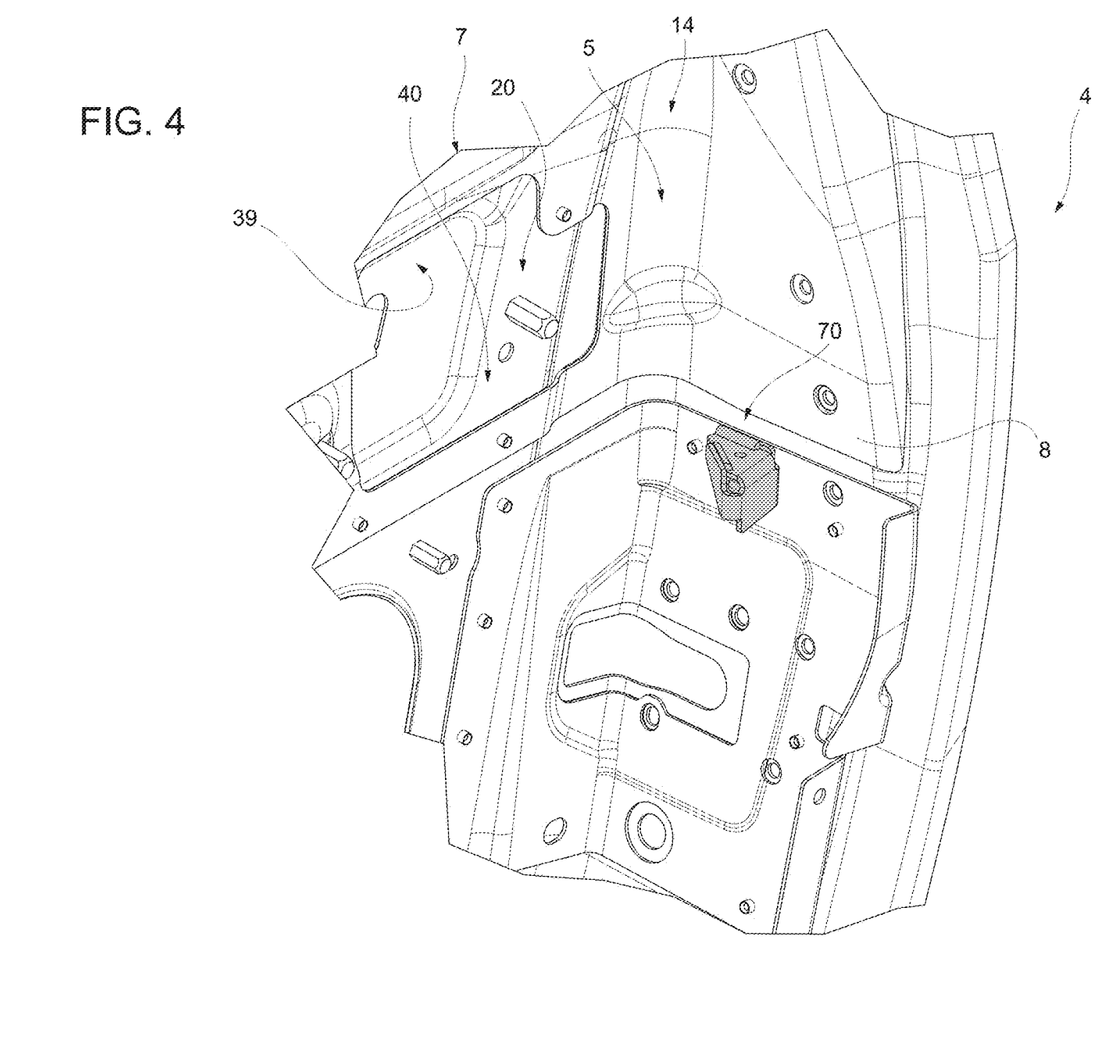
FIG. 4 is a perspective view, on a larger scale, from the inside of the motor vehicle and according to a different visual angle, of second components of the door of FIGS. 1 and 2, with parts removed for greater clarity.
Figure 5:
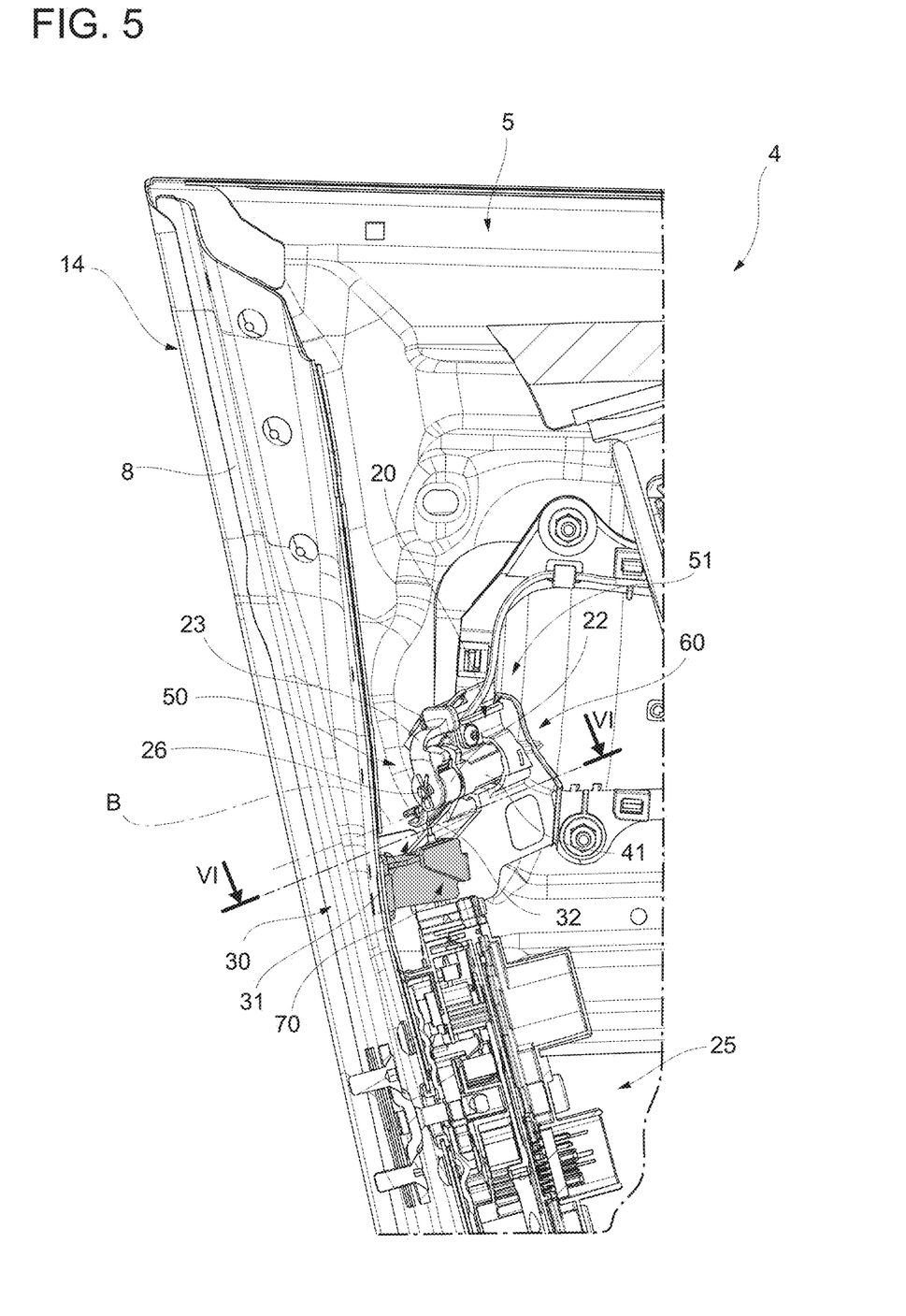
FIG. 5 is a view, from the inside of the motor vehicle, of the door of FIG. 1, on a much larger scale and with parts removed for greater clarity.

The Bowden cable 31 further comprises a portion 34 ending in the end 32, opposite the end 33 and extending along an axis C orthogonal to the axis A (FIG. 3).

The end 32 is connected to the ratchet 22 through the lever 24 and the end 33 is connected to the opening mechanism.

The lever 24 is hinged to the ratchet 22 around the axis A and to the end 32 around an axis B parallel to the axis A (FIG. 3).

To sum up, the rotation of the ratchet 22 determined by the use of the key causes the rotation of the lever 24 around the axis A and the consequent pulling of the Bowden cable 31 along the axis C as well as the shift of the opening mechanism from the closed configuration to the open configuration.

The support body 20 is fixed to the panel 6 and is crossed by the ratchet 22 and by the portion 34 of the Bowden cable 31.

More in detail, the support body 20 comprises (FIGS. 3 to 6):
a wall 40 defining a concave seat 39, open towards and having a contour contiguous with the wall 6;

a cylindrical wall 41, adjacent to the wall 40 and coaxially crossed, with a clearance, by the ratchet 22; and a seat 45 housing the portion 34 of the Bowden cable 31 and a part of the lever 24 adjacent to the axis B.

More in detail, the notch of the ratchet 22 faces the inside of the seat 39.

The seat 45 is delimited by a pair of walls 46, 47 of the support body 20, which are parallel and spaced apart from one another.

The walls 46, 47 are orthogonal to an axis D (FIG. 6) orthogonal to the axes A, B, C.

The wall 47 extends from the wall 41 and the wall 46 is joined to the wall 41 by a wall 49 orthogonal to the walls 46, 47.

The wall 46 is located on the side of the wall 6 and the wall 47 is located on the side of the wall 7. More in particular, the wall 47 is interposed between the wall 46 and the panel 6.

The support body 20 further comprises a wall 49 extending orthogonally to the walls 46, 47 and defining an engagement seat for a support element 48 of the Bowden cable 31 visible in FIG. 3.

The support body 20 defines:

a first portion 50 comprising the wall 40, the ratchet 22, the walls 41, 46, 47, 49 and the seats 39, 45; and a second portion 51 comprising the remaining part of the support body 20.

The portions 50, 51 are integral to one another, when the door 4 is in a normal operating condition.

Hereinafter and in the claims attached hereto, the expression "normal operating condition" means a condition in which the door 4 has not suffered any side impact and the motor vehicle 1 is fully operational.

Advantageously, the support body 20 comprises a preferential breaking area 60 (FIG. 3) designed to break due to a predetermined load in case of impact of the door 4, so as to determine the separation of the portions 50, 51.

In this way, in case of impact, the ratchet 22 and the Bowden cable 31 are separated from the second portion 51 of the support body 20.

More in detail, the area 60 is shaped like an open line, a curved open line in the case shown herein, surrounding the ratchet 22 and the Bowden cable 31.

The area 60 further defines a weakening of the support body 20. In particular, the thickness of the area 60 is smaller than the thickness of the portions 50, 51.

The door 4 further comprises a bracket 70 (FIGS. 4 to 6) fixed to the pillar 8, extending inside the compartment 13 and designed to strike against the portion 50 during the impact, so as to facilitate the separation between the portions 50, 51 along the area 60.

More in detail, the bracket 70 strikes against the wall 47 of the support body 20 during the impact.

Figure 6:
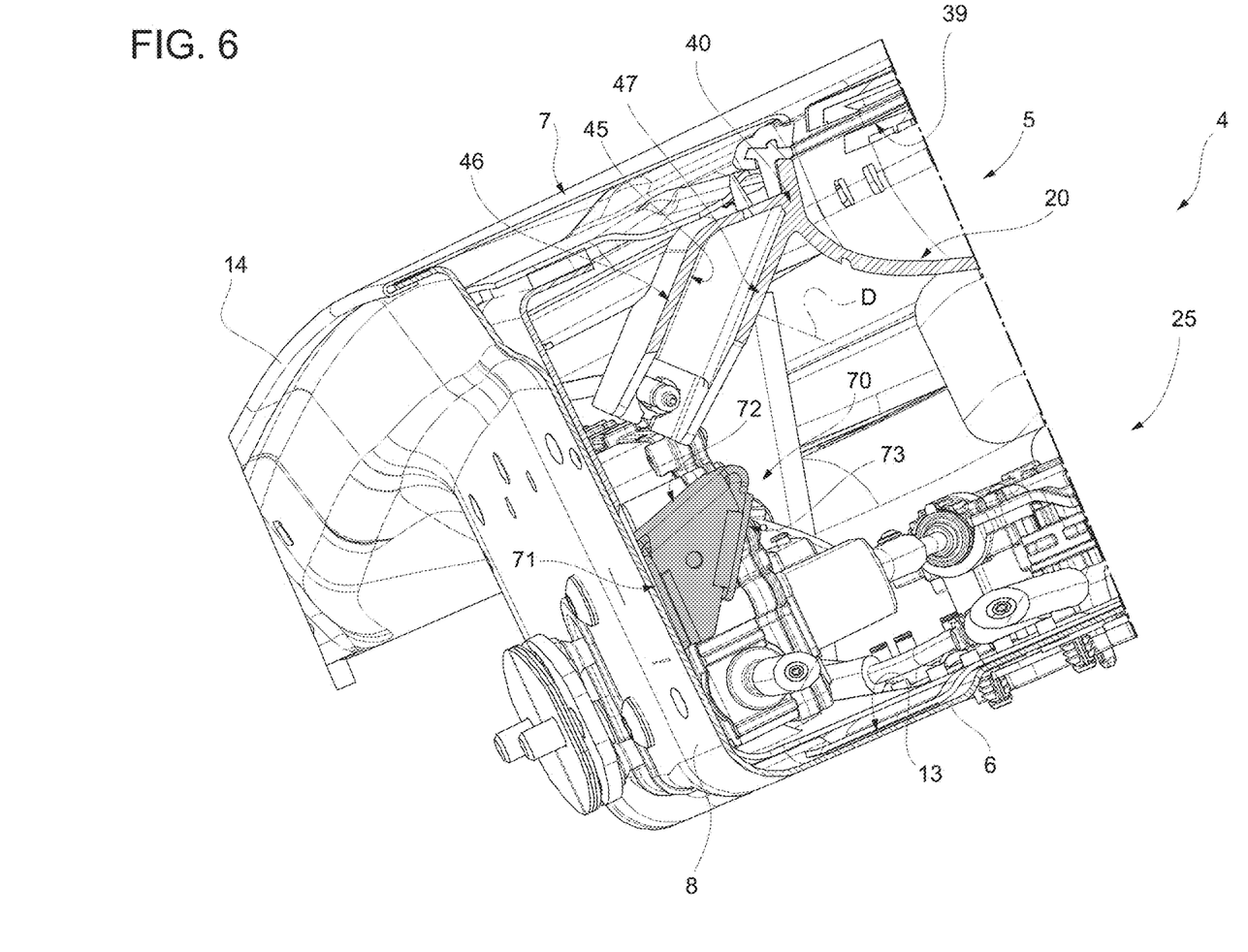
FIG. 6 is a cross section along line VI-VI of FIG. 5.

In the embodiment shown in FIG. 6, the bracket 70 has a cross section with a triangular shape.

The bracket 70 comprises, in turn, (FIG. 6):

a wall 71 fixed to the pillar 8;

a wall 72 defining a striking surface for the wall 47 of the support body 20; and a wall 73 interposed between the walls 71, 72.

In particular, the wall 72 is orthogonal to the wall 71 and the wall 73 is inclined relative to the wall 72.

The operation of the door 4 is described starting from a condition of normal operation and from the closing position of the door 4.

In this condition, the closing mechanism of the lock 25 is in the closed configuration and the portions 50, 51 of the support body 20 are integral to one another.

The door 4 can normally be moved to the opening position by acting upon the handle 21 so as to generate, through the microswitch, the control signal that determines the activation of the opening mechanism and the consequent shift of the lock 25 from the closed configuration to the open configuration.

In case of absence of supply of power to the microswitch, the opening mechanism can be operated by means of the capacitive diode or by means of the mechanical back-up system 30 by inserting and turning the key in the notch of the ratchet 22.

The rotation of the ratchet 22 around the axis A determines the pulling of the Bowden cable 31 along the axis C and the consequent activation of the opening mechanism.

In the event of a side impact of the door 4, the support body 20 breaks in the area 60 and the wall 47 of the seat 45 interacts with the bracket 70.

Consequently, the portion 50 with the ratchet 22 and the seat 45 housing the portion 34 of the Bowden cable 31 gets separated from the portion 51.

Hence, the portion 50 substantially remains in the position prior to the impact, whereas the portion 51 is pushed towards the wall 7 of the door 4.

Figure 7:
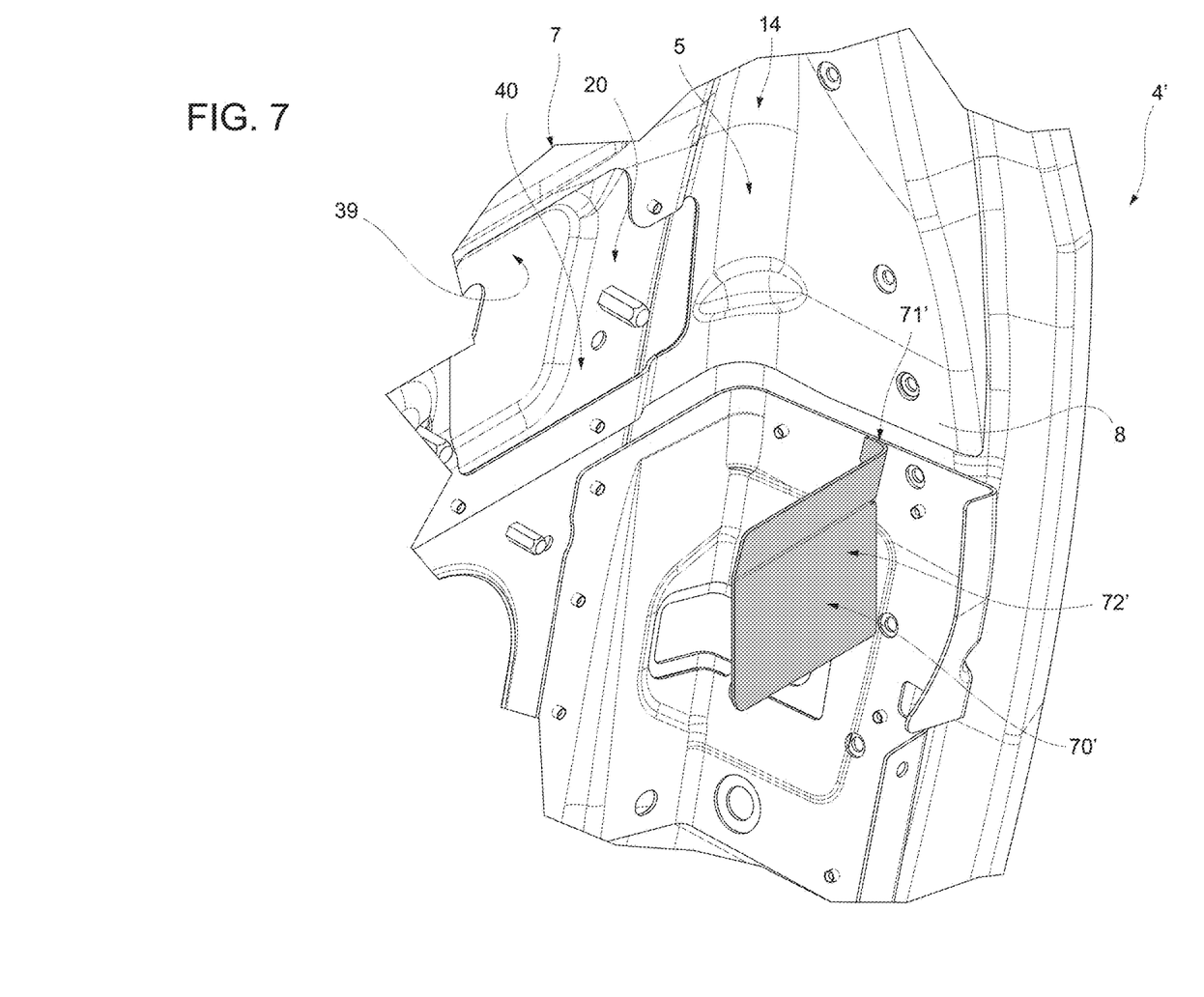
FIGS. 7 and 8 show second components of a second and third embodiment, respectively, of the door of FIGS. 1 to 6, with parts removed for greater clarity.

FIG. 7 shows a door 4' according to a second embodiment of the invention.

The door 4' is similar to the door 4 and will be described below only to the extent that it differs from the latter; equal or equivalent parts of the doors 4, 4' will be indicated, when possible, with the same reference numbers.

More in detail, the bracket 70' of the door 4' differs from the bracket 70 of the door 4 in that it does not comprise the wall 73, due to the fact that the wall 71' has a smaller surface than the wall 72'. The wall 72' further projects from an end edge of the wall 71' located on the side of the panel 6.

The operation of the motor door 4' is completely similar to the one of the door 4 and, therefore, it will not be described in detail.

Figure 8:
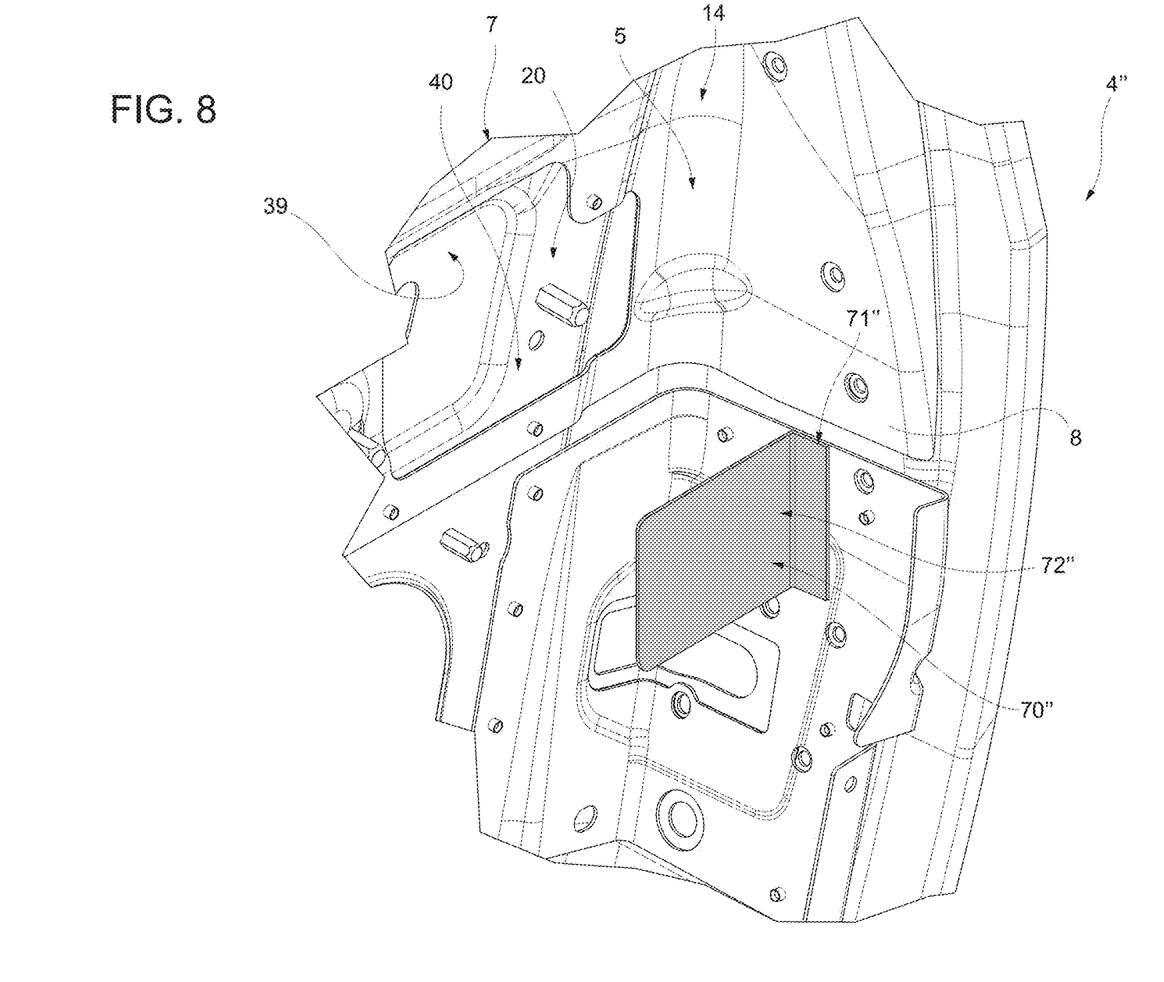

FIG. 8 shows a door 4" according to a third embodiment of the invention.

The door 4" is similar to the door 4' and will be described below only to the extent that it differs from the latter; equal or equivalent parts of the doors 4', 4" will be indicated, when possible, with the same reference numbers.

More in detail, the bracket 70" of the door 4" differs from the bracket 70' of the door 4' in that the wall 72" projects from an end edge of the wall 71' located on the side of the wall 7.

The features of the door 4, 4', 4" according to the invention reveal evident advantages that can be obtained using it.

In particular, the support body 20 breaks in the preferential breaking area 60 in case of a side impact of the door 4. Consequently, the portion 50 comprising the ratchet 22 and the Bowden cable 31 gets separated from the portion 51.

Consequently, the portion 50 with the ratchet 22 and the seat 45 housing the portion 34 of the Bowden cable 31 gets separated from the portion 51.

Hence, the portion 50 substantially remains in the position prior to the impact, whereas the portion 51 is pushed towards the wall 7 of the door 4, 4', 4".

This avoids the risk that the walls 46, 47 delimiting the seat 45 collide with further components housed in the compartment 7, resulting in damage.

Consequently, the risk of accidental pulling of the Bowden cable 31 and of any consequent accidental shift of the closing mechanism from the closed configuration to the open configuration is avoided.

The interaction of the wall 47 with the bracket 70, 70', 70" helps make the separation of the portion 51 from the portion 50 repeatable and controlled.

Finally, the door 4, 4', 4" disclosed and shown herein can be subject to changes and variants, which do not go beyond the scope of protection set forth in the appended claims.

The invention claimed is:

1. A door (4, 4', 4") for a motor vehicle (1) comprising:
    a lock (25) available in a closed configuration, in which it prevents said door (4, 4', 4") from shifting from a closed position to an open position, and in an open configuration, in which it allows said door (4, 4', 4") to shift from said closed position to said open position; said door (4, 4', 4") allowing, in use, access to a passenger compartment (3) of said motor vehicle (1) in said open position and forbidding in use, access to said passenger compartment (3) in said closed position;
    a support body (20) comprising, in turn, a first portion (50) and a second portion (51), which are integral to one another, when said door (4, 4', 4") is, in use, in a normal operating condition;
    a ratchet (22) supported by said first portion (50) of said support body (20) and capable of being operated to determine the shifting of said lock (25) from said closed configuration to said open configuration; and
    a Bowden cable (31), which is interposed between said ratchet (22) and said lock (25), can be operated by said ratchet (22) and is at least partly housed in a first seat (45) defined by said first portion (50) of said support body (20);
    characterized in that said support body (20) comprises a preferential breaking area (60) designed to break, in use, due a predetermined load in case of impact of said door (4, 4', 4"), so as to determine the separation of said first portion (50) carrying said Bowden cable (31) and said ratchet (22) from said second portion (51) of the support body (20).

2. The door according to claim 1, characterized in that said preferential area (60) is shaped like an open curved line.

3. The door according to claim 1, characterized in that said preferential area (60) has a first thickness, which is smaller than a second thickness of said first and second portion (50, 51).

4. The door according to claim 1, characterized in that it further comprises a handle (21), which can be operated to determine the shifting of said lock (25) from said closed configuration to said open configuration;
    said ratchet (22) being capable of being operated by a key;
    said support body (20) comprising a first concave wall (40) defining a second seat (39) housing said handle (21) supported by said support body (20) and said ratchet (22).

5. The door according to claim 4, characterized in that said first portion (50) of said support body (20) comprises, in turn:
    a fourth wall (41) contiguous with said first wall (40) and housing said ratchet (22);
    at least a fifth wall (46, 47) projecting from one of said first and fourth walls (40, 41) and delimiting said first seat (45) housing an end (32) of said Bowden cable (31) opposite said lock (25) and arranged on the side of said ratchet (22);
    said fifth wall (46, 47) being spaced apart from said bracket (70, 70', 70") in said normal operating condition of said door (4) and striking against said bracket (70, 70', 70"), in use, during said impact.

6. The door according to claim 5, characterized in that said bracket (70, 70', 70") comprises, in turn: a sixth wall (71, 71', 71") fixed to said pillar (8) and a seventh wall (72, 72', 72") defining, in use, a striking surface for said fifth wall (46, 47) during said impact.

7. The door according to claim 6, characterized in that it comprises an eighth wall (73) interposed between said sixth and seventh walls (71, 72); said eighth wall (73) extending crosswise to said sixth wall (71) and to said seventh wall (72).

8. The door according to claim 6, characterized in that said sixth and seventh walls (71', 72'; 71", 72") are contiguous with, adjacent and transverse to one another.

9. The door according to claim 1, comprising:
    a skeleton (5) defining a second wall (7) of said door (4, 4', 4") and a pillar (8) transverse to said first wall (7);
    a panel (6) defining a third wall (9) opposite said first wall (7); and
    a compartment (13) defined between said skeleton (5) and said panel (6) and partly housing said support body (20);
    said door (4, 4', 4") further comprising a bracket (70, 70', 70") fixed to said pillar (8), extending inside said compartment (13) and designed to strike against said first portion (50) of said support body (20) in use, during said impact.

10. A motor vehicle comprising:
    a body (2) defining a passenger compartment (3); and
    a door (4, 4', 4") according to claim 1.

* * * * *